United States Patent
Tang et al.

(10) Patent No.: US 11,734,948 B2
(45) Date of Patent: Aug. 22, 2023

(54) DEVICE AND METHOD FOR CONTACTLESS FINGERPRINT ACQUISITION

(71) Applicant: MOQI TECHNOLOGY (BEIJING) CO., LTD., Beijing (CN)

(72) Inventors: Linpeng Tang, Beijing (CN); Cheng Tai, Beijing (CN); Feng Kang, Beijing (CN); Wei Hu, Beijing (CN); Bo Liu, Beijing (CN)

(73) Assignee: MOQI TECHNOLOGY (BEIJING) CO., LTD., Beijing (CN)

( * ) Notice: Subject to any disclaimer, the term of this patent is extended or adjusted under 35 U.S.C. 154(b) by 21 days.

(21) Appl. No.: 17/425,268

(22) PCT Filed: Mar. 11, 2019

(86) PCT No.: PCT/CN2019/077689
§ 371 (c)(1),
(2) Date: Jul. 22, 2021

(87) PCT Pub. No.: WO2020/181465
PCT Pub. Date: Sep. 17, 2020

(65) Prior Publication Data
US 2022/0327858 A1    Oct. 13, 2022

(51) Int. Cl.
*G06V 40/12* (2022.01)
*G06V 10/141* (2022.01)
(Continued)

(52) U.S. Cl.
CPC ........ *G06V 40/1335* (2022.01); *G06V 10/141* (2022.01); *G06V 10/82* (2022.01);
(Continued)

(58) Field of Classification Search
CPC .. G06V 40/1335; G06V 10/141; G06V 10/82; G06V 40/1312; G06V 40/1376;
(Continued)

(56) References Cited

U.S. PATENT DOCUMENTS

| 10,956,712 B1* | 3/2021 | Picardo | G06V 20/647 |
| 2005/0265585 A1* | 12/2005 | Rowe | G06V 40/1324 |
| | | | 382/191 |

(Continued)

FOREIGN PATENT DOCUMENTS

| CN | 101971191 A | 2/2011 |
| CN | 102509094 A | 6/2012 |

(Continued)

OTHER PUBLICATIONS

Zhang, D., & Lu, G. *3D Biometrics: Systems and Applications*, Springer, New York, 2013, Part IV, "3D Fingerprint Identification by Multi-View Approach," pp. 171-216.

(Continued)

*Primary Examiner* — Premal R Patel
(74) *Attorney, Agent, or Firm* — Seed IP Law Group LLP

(57) ABSTRACT

A device and a method for contactless fingerprint acquisition is provided. The contactless fingerprint acquisition device includes a housing including a finger scanning area for at least one finger; at least two image capturing devices located in the housing and arranged in a predetermined baseline distance, each image capturing device having an optical axis in a predetermined angle with the vertical direction; and, a lighting unit in the housing for illuminating the at least one finger. The at least two image capturing devices are operable to acquire a plurality of partial fingerprint images of the at least one finger, and the plurality of partial fingerprint images correspond to different portions of the at least one finger.

14 Claims, 8 Drawing Sheets

(51) Int. Cl.
    *G06V 10/82*     (2022.01)
    *G06V 40/13*     (2022.01)
    *H04N 23/51*     (2023.01)
    *H04N 23/56*     (2023.01)
    *H04N 23/73*     (2023.01)

(52) U.S. Cl.
    CPC ...... *G06V 40/1312* (2022.01); *G06V 40/1376* (2022.01); *H04N 23/51* (2023.01); *H04N 23/56* (2023.01); *H04N 23/73* (2023.01); *G06V 2201/121* (2022.01)

(58) Field of Classification Search
    CPC ........... G06V 2201/121; G06V 20/647; H04N 5/2252; H04N 5/2256; H04N 5/2353
    See application file for complete search history.

(56) References Cited

U.S. PATENT DOCUMENTS

| | | | |
|---|---|---|---|
| 2006/0023197 A1 | 2/2006 | Joel | |
| 2012/0057762 A1* | 3/2012 | Rowe | G06V 10/143 382/115 |
| 2012/0076369 A1 | 3/2012 | Abramovich et al. | |
| 2014/0044322 A1* | 2/2014 | Kumar | G06K 9/00 382/124 |
| 2015/0093017 A1 | 4/2015 | Hefeeda et al. | |
| 2015/0130917 A1* | 5/2015 | Mil'shtein | G06V 40/1312 348/77 |
| 2015/0138331 A1* | 5/2015 | Huang | G06V 40/1324 348/262 |
| 2015/0234454 A1* | 8/2015 | Kurz | G06F 3/0425 345/156 |
| 2016/0188950 A1 | 6/2016 | Liu et al. | |
| 2017/0097417 A1 | 4/2017 | Wang | |
| 2017/0343493 A1 | 11/2017 | Reischig | |
| 2019/0034694 A1 | 1/2019 | Ross | |
| 2020/0132724 A1* | 4/2020 | Wang | G01R 1/07364 |
| 2020/0202101 A1* | 6/2020 | Howell | G06V 40/1312 |

FOREIGN PATENT DOCUMENTS

| | | |
|---|---|---|
| CN | 104361315 A | 2/2015 |
| CN | 106127172 A | 11/2016 |
| CN | 107274483 A | 10/2017 |
| CN | 109165678 A | 1/2019 |
| CN | 109190554 A | 1/2019 |
| CN | 109196520 A | 1/2019 |
| CN | 109271890 A | 1/2019 |
| WO | WO 2007050776 A2 | 5/2007 |
| WO | 2018/161095 A1 | 9/2018 |

OTHER PUBLICATIONS

FenFen, Qin, "3D Reconstruction of Fingerprint Based on The Parallel Binocular Vision", Southwest University of Science and Technology Master Degree Thesis, Apr. 21, 2015, 75 pages.

Latorre-Carmona, Pedro, et al., "Three-Dimensional Imaging With Multiple Degrees of Freedom Using Data Fusion", Invited Paper, vol. 103, No. 9, Sep. 2015, 18 pages.

Yang, Yulong et al., "The Deep Learning Method for Automatic Identification of Dislocated Fingerprint Image", University of Chinese Academy of Sciences, Beijing, China, 8 pages.

Zhou, Jia-Li et al., "A 3D Face Reconstruction and Recognition Method Based on Passive Binocular Stereo Vision", National Natural Science Foundation of China, Apr. 3, 2008, 9 pages.

* cited by examiner

DEVICE AND METHOD FOR CONTACTLESS FINGERPRINT ACQUISITION

TECHNICAL FIELD

The disclosure relates generally to acquisition of fingerprints, and more specially to a contactless fingerprint acquisition device and a method for contactless fingerprint acquisition.

BACKGROUND

Most conventional systems for acquiring fingerprint images rely on physical contact between a finger and a fingerprint scanner apparatus. When a high quality, large area fingerprint is required, the finger also needs to be rolled from one side to the other on a surface of the scanner apparatus to increase the total contact area. When such systems are used with non-compliant individuals, the additional force used to acquire fingerprints often causes larger distortions of the fingerprint, and the individuals may also intentionally move the fingers during acquisition process, resulting in blurriness of the acquired fingerprint images. Such issues greatly increase the difficulty and time used to acquire large area, high quality fingerprints.

In addition, contact-based fingerprint scanners have found wide applications in access control, banking and other industries for biometric authentication. The requirement of placing finger on the scanner decreases the authentication speed and raises concern on hygiene as well.

There also exist contactless fingerprint scanners for acquiring a fingerprint image in a contactless manner. But the image quality of the fingerprint image acquired by these scanners is not good enough, and the area of the acquired fingerprint is limited. Some scanners may also have a problem of reliability.

SUMMARY

It would be desirable to obviate at least some of the above disadvantages and provide an improved device and method for contactless fingerprint acquisition.

To better address one or more of these concerns, in a first aspect of the disclosure, a contactless fingerprint acquisition device is provided. The contactless fingerprint acquisition device comprises: a housing including a finger scanning area for at least one finger; at least two image capturing devices located in the housing and arranged in a predetermined baseline distance, each image capturing device having an optical axis in a predetermined angle with the vertical direction; and a lighting unit in the housing for illuminating the at least one finger. The at least two image capturing devices are operable to acquire a plurality of partial fingerprint images of the at least one finger, and the plurality of partial fingerprint images correspond to different portions of the at least one finger.

Due to the contactless fingerprint acquisition device, a fingerprint image with improved image quality and larger area can be obtained.

In a second aspect of the disclosure, a method for contactless fingerprint acquisition is provided. The method comprises: generating at least two disparity maps corresponding to different portions of at least one finger from a plurality of partial fingerprint images of the at least one finger; deriving depth information from the plurality of partial fingerprint images; reconstructing a 3D fingerprint model from the at least two disparity maps and the depth information; and stitching the plurality of partial fingerprint images onto a surface of the 3D fingerprint model to obtain a 3D fingerprint image.

In a third aspect of the disclosure, a method for contactless fingerprint acquisition is provided. The method comprises: generating at least two disparity maps corresponding to different portions of at least one finger from a plurality of fingertip region images of the at least one finger; deriving depth information from the plurality of fingertip region images; reconstructing a 3D fingerprint model from the at least two disparity maps and the depth information; and, stitching the plurality of fingertip region images onto a surface of the 3D fingerprint model to obtain a 3D fingerprint image.

In a fourth aspect of the disclosure, a method for contactless fingerprint acquisition is provided. The method comprises: deriving depth information from a plurality of partial fingerprint images of at least one finger acquired by at least two image capturing devices, by use of at least one of active stereo vision, structured light, time-of-flight (ToF) and photometrics stereo; building at least two first 3D fingerprint models from the plurality of partial fingerprint images and the depth information derived by use of at least one of active stereo vision, structured light, time-of-flight (ToF) and photometrics stereo; generating a second 3D fingerprint model by combination of the at least two first 3D fingerprint models; and, stitching the plurality of partial fingerprint images onto a surface of the second 3D fingerprint model to obtain a 3D fingerprint image.

In a fifth aspect of the disclosure, a computer readable storage medium is provided. The computer readable storage medium comprises instructions which, when executed by a processor, cause the processor to perform the methods as described above.

These and other aspects of the disclosure will be apparent from and elucidated with reference to the embodiments described hereinafter.

BRIEF DESCRIPTION OF THE DRAWINGS

Embodiments of the present disclosure will be described in the following by way of examples and with reference to the accompanying drawings, without limiting the scope of protection as defined by claims. In the Figures:

DETAILED DESCRIPTION OF THE EMBODIMENTS

Figure 1:
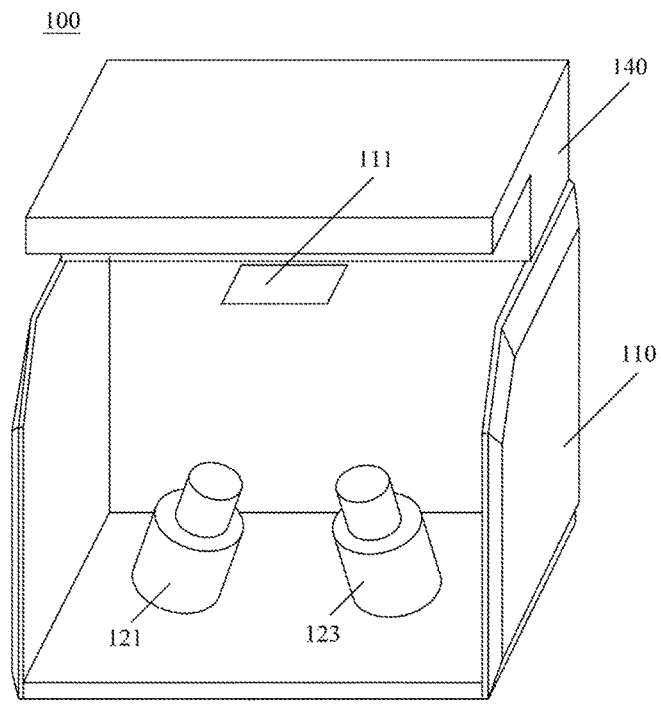
FIG. 1 is schematic perspective view of a contactless fingerprint acquisition device according to an embodiment of the present disclosure.

While the disclosure covers various modifications and alternative constructions, embodiments of the disclosure are shown in the drawings and will hereinafter be described in detail. However, it should be understood that the specific description and drawings are not intended to limit the disclosure to the specific forms disclosed. On the contrary, it is intended that the scope of the claimed disclosure includes all modifications and alternative constructions thereof falling within the scope of the disclosure as expressed in the appended claims.

As described above, contact-based fingerprint scanners are widely used in different industries, and there are two categories of such devices.

For the most commonly seen contact-based fingerprint scanner, a person only needs to place his or her finger on the scanning area, and the fingerprint can be automatically captured through electrical signals or optical images. Such devices are widely used from access control to smartphone authentication. They are often made very cheap and small, in sacrifice of the captured fingerprint area. Moreover, because human fingers are not flat, there is a fundamental difficulty to capture whole fingerprint area using one touch of the device. Contact-based fingerprint scanners may also cause concerns on hygiene and privacy when deployed in public areas, and they may not be fast enough when used with high user volumes.

The other is the rolled fingerprint scanner. Such devices are widely used in criminal investigation, where large-area, high quality fingerprint images are collected from a person, and can be used to match against the low quality and often partial fingerprints collected from the crime scene in order to identify the suspect. Fingerprint quality (e.g. fingerprint area and image quality) is the primary metric for evaluating such fingerprint scanners, and current devices require the person to roll his finger from left to right in order to capture as large fingerprint area as possible. However, the rolling process may cause distortion of the fingerprint, and a non-compliant suspect may deliberately apply additional force to cause more distortions, and may even move the finger slightly to cause blurriness of the fingerprint image.

Embodiments described here provide for a device and method for acquiring fingerprint, without direct contact of an individual's fingers.

Figure 2:
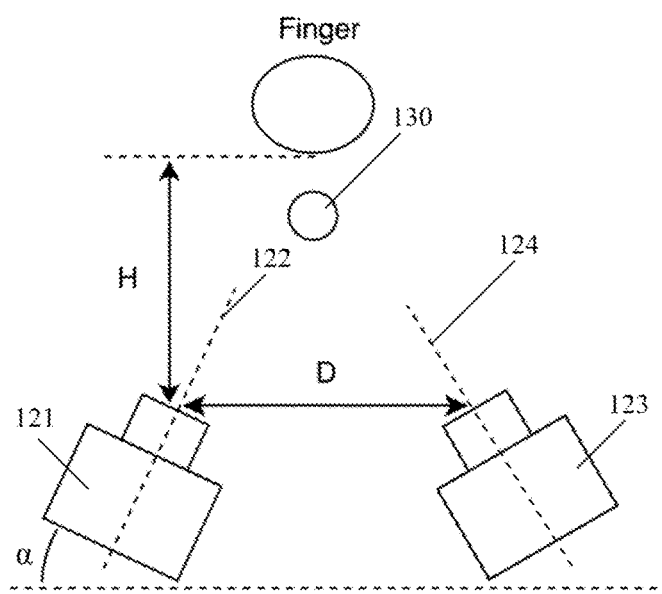
FIG. 2 is a schematic view of an internal structure of the contactless fingerprint acquisition device as shown in FIG. 1.

FIG. 1 is a schematic perspective view of a contactless fingerprint acquisition device according to an embodiment of the present disclosure, and FIG. 2 is a schematic view of an internal structure of the contactless fingerprint acquisition device as shown in FIG. 1.

As shown in FIGS. 1 and 2, a contactless fingerprint acquisition device 100 according to an embodiment of the present disclosure comprises a housing 110, two image capturing devices 121 and 123 located in the housing 110, and a lighting unit 130 (not shown in FIG. 1) in the housing 110 for illuminating at least one finger. The two image capturing devices 121 and 123 are operable to acquire a plurality of partial fingerprint images of the at least one finger, and the plurality of partial fingerprint images correspond to different portions of the at least one finger. For example, the partial fingerprint image(s) acquired by the image capturing device 121 can mainly correspond to the left portion of the at least one finger, while the partial fingerprint image(s) acquired by the image capturing device 123 can mainly correspond to the right portion of the at least one finger.

It should be understood that, the number of the image capturing devices in the contactless fingerprint acquisition device is not limited to two, three or more image capturing devices can be used instead, though only two image capturing devices 121 and 123 are shown in FIGS. 1 and 2 as an example. Therefore, the contactless fingerprint acquisition device can comprise at least two image capturing devices. In addition, the positions of the lighting unit and the image capturing devices are not limited to those as shown in FIGS. 1 and 2. According to specific applications and/or requirements, the positions of the lighting unit and the image capturing devices can be changed.

As shown in FIG. 1, the housing 110 includes a finger scanning area 111 for at least one finger. The finger scanning area 111 can be a transparent area on an upper surface of the housing 110, which is a rectangular area, for example. According to another embodiment, the contactless fingerprint acquisition device 100 further comprises a cap 140 for covering the finger scanning area 111.

The two image capturing devices 121 and 123 are arranged in a predetermined baseline distance. Each image capturing device has an optical axis in a predetermined angle with a vertical direction, which angle is equivalent to an angle of the base of the image capturing device with respect to a horizontal direction. As shown in FIG. 2, the image capturing device 121 has an optical axis 122, and the image capturing device 123 has an optical axis 124. D is the baseline distance between the two image capturing devices. H is the distance between the at least one finger and the image capturing device. α is the angle of the base of the image capturing device with respect to the horizontal direction.

The two image capturing devices 121 and 123 are cameras, for example. The aperture of camera lens of each camera has a F-number in the range of 4 to 12, where the F number is the ratio of a focal length of the camera lens of each camera to a diameter of an entrance pupil of the camera lens. A large F-number corresponds to a small aperture, increases the depth of field, and accordingly increases the moving space of the fingers while still capturing sharp images of the fingerprint. However, if the F-number is too large, it allows too little light entering into the cameras and doesn't provide enough illumination. A F-number in the range of 4 to 12 is used to balance between large hand moving space and good illumination. According to another embodiment, the predetermined baseline distance between the two cameras can be in the range of 3 cm to 20 cm, and the angle α is in the range of 5 to 45 degrees.

In the contactless fingerprint acquisition device as shown in FIG. 2, the two image capturing devices 121 and 123 are arranged symmetrically, i.e., the distance between the at least one finger and the image capturing device 123 and the angle of the base of the image capturing device 123 with respect to the horizontal direction are the same as those of the image capturing device 121. But the present disclosure is not limited to such arrangement. The two image capturing devices can be arranged in different distances from the at least one finger and in different angles with respect to the horizontal direction.

Figure 3:
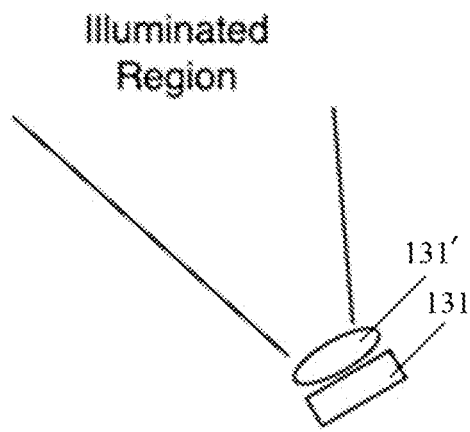
FIG. 3 is a schematic view of a lighting unit in a contactless fingerprint acquisition device according to another embodiment of the present disclosure.
Figure 4:
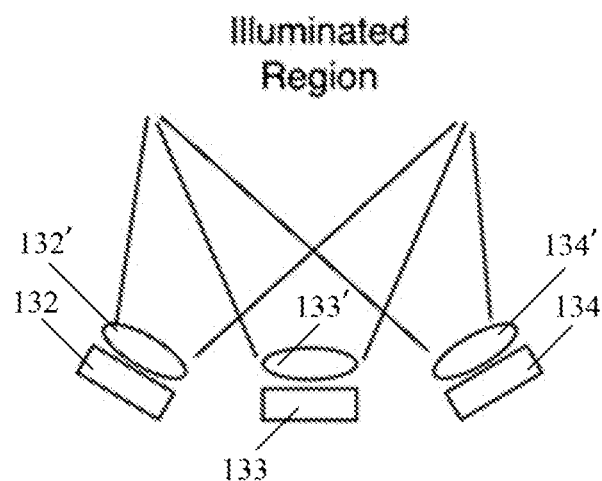
FIG. 4 is a schematic view of a lighting unit in a contactless fingerprint acquisition device according to another embodiment of the present disclosure.
Figure 5:
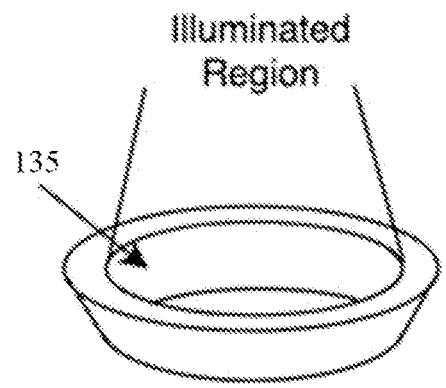
FIG. 5 is a schematic view of a lighting unit in a contactless fingerprint acquisition device according to another embodiment of the present disclosure.

FIGS. 3-5 show schematic views of lighting units in contactless fingerprint acquisition devices according to different embodiments of the present disclosure.

As shown in FIG. 3, the lighting unit of the contactless fingerprint acquisition device comprises one visible light source 131 and one optical component 131' arranged above the visible light source 131. In FIG. 4, the lighting unit of the contactless fingerprint acquisition device comprises three visible light sources 132, 133, 134 and three optical components 132', 133', 134' arranged above these visible light sources, respectively. The visible light source(s) can be LED light source(s), for example. The optical component(s) can be lens, for example. As shown in FIG. 5, the lighting unit comprises a ring-type visible light source 135, for example, a ring-type LED light source.

It should be understood that, the number of the visible light sources and the number of the optical components in the lighting unit is not limited to the numbers as shown in FIGS. 3 and 4. The numbers of the visible light sources and the optical components can be selected according to specific applications and/or requirements. Therefore, the lighting unit of the contactless fingerprint acquisition device can comprise at least one visible light source and at least one optical component arranged above the at least one visible light source.

FIGS. 3-5 show different illumination solutions that are designed in order to achieve uniform lighting of the finger(s) while enhancing the visibility of fingerprint ridges. In particular, FIG. 3 shows one visible light source with an optical component to illuminate the finger(s), which is a simple setup with lower cost. FIG. 4 shows three visible light sources pointed at different angles to provide better illumination on the left, the right and the upper sides of the finger(s). Furthermore, the illuminated regions of the three visible light sources can largely overlap in order to achieve more uniform illumination. FIG. 5 shows a ring-type visible light source, which can provide illumination from all angles. These different illumination solutions can be used according to the requirement of fingerprint quality, device size and cost, etc.

According to another embodiment, the lighting unit further comprises an infrared light source (not shown in the figures), and the at least two image capturing devices are operable to further capture a plurality of partial fingerprint infrared images.

Figure 6:
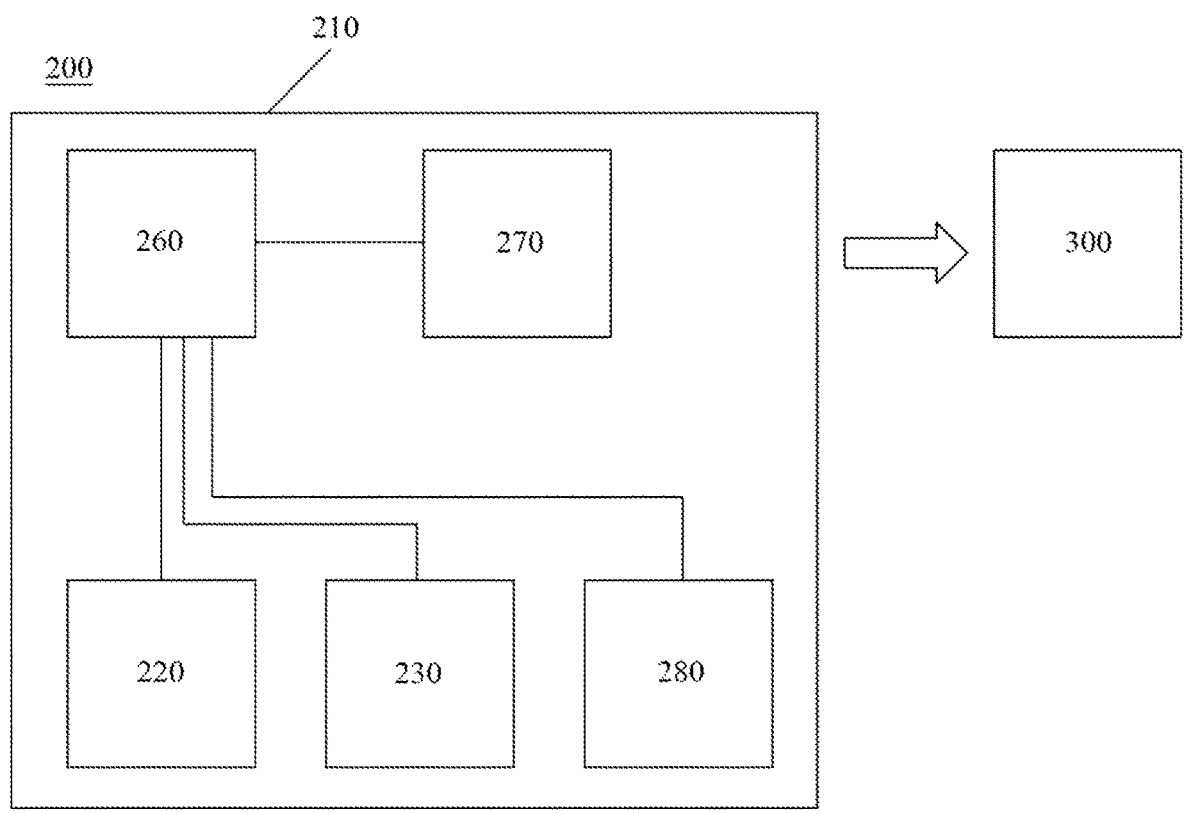
FIG. 6 is a schematic view of a contactless fingerprint acquisition device according to another embodiment of the present disclosure.

FIG. 6 is a schematic view of a contactless fingerprint acquisition device according to another embodiment of the present disclosure.

As shown in FIG. 6, the contactless fingerprint acquisition device 200 comprises: a housing 210, which includes a finger scanning area (not shown in FIG. 6) for at least one finger; at least two image capturing devices 220 located in the housing 210, which can be arranged in a predetermined baseline distance, with each image capturing device having an optical axis in a predetermined angle with a vertical direction; and a lighting unit 230 in the housing 210 for illuminating the at least one finger. The at least two image capturing devices 220 are operable to acquire a plurality of partial fingerprint images of the at least one finger, and the plurality of partial fingerprint images correspond to different portions of the at least one finger.

As shown in FIG. 6, the contactless fingerprint acquisition device 200 further comprises a depth sensing unit 280 for sensing depth information of the plurality of partial fingerprint images. In particular, the depth sensing unit comprises at least one of an active stereo vision component, a structured light component, a time-of-flight (ToF) component and a photometrics stereo component.

As shown in FIG. 6, the contactless fingerprint acquisition device 200 further comprises a processor 260. The processor 260 can be coupled to the image capturing devices 220, the lighting unit 230 and the depth sensing unit 280 and can be used for controlling these devices and units. The processor 260 can be any custom made or commercially available processor, a central processing unit (CPU), an auxiliary processor among several processors, a semiconductor-based microprocessor (in the form of a microchip or chip set), etc. It should be noted that, however, the processor 260 is an optional unit of the contactless fingerprint acquisition device. The image capturing devices 220, the lighting unit 230 and the depth sensing unit 280 can be controlled by an external device, for example, a computing device, instead of the processor.

In an embodiment, the at least two image capturing devices 220 comprised in the contactless fingerprint acquisition device 200 can be cameras. Light from the lighting unit 230 can flash simultaneously with shutters of the cameras. Global shutter cameras can be used to obtain higher-quality images with a short exposure time while the hand is moving, but otherwise rolling shutter cameras can be used to capture images of still hands. The cameras can be controlled by the processor 260 so that they are triggered simultaneously with the same exposure time. And light from the lighting unit 230 can flash simultaneously with shutters of the cameras, i.e. flash at the same time with camera exposure to reduce energy and heat emission while achieving same illumination effects. In another embodiment, the cameras and the lighting unit are controlled by an external computing device instead.

According to another embodiment, the processor 260 can be used for processing the plurality of partial fingerprint images to obtain a 3D fingerprint image by combination of the plurality of partial fingerprint images. Details for processing the plurality of partial fingerprint images to obtain the 3D fingerprint image will be further described hereinafter.

In another embodiment, the contactless fingerprint acquisition device 200 further comprises a communication interface 270 to transmit the plurality of partial fingerprint images to an external device 300, as shown in FIG. 6. The communication interface 270 can be Universal Serial Bus (USB), GigE, CameraLink, RS485, RS422, wireless network interface, or Bluetooth. The external device 300 can be a server or a computing device. The plurality of partial fingerprint images can be processed by the server or the computing device, instead of the processor 260, to obtain a 3D fingerprint image by combination of the plurality of partial fingerprint images.

Figure 7A:
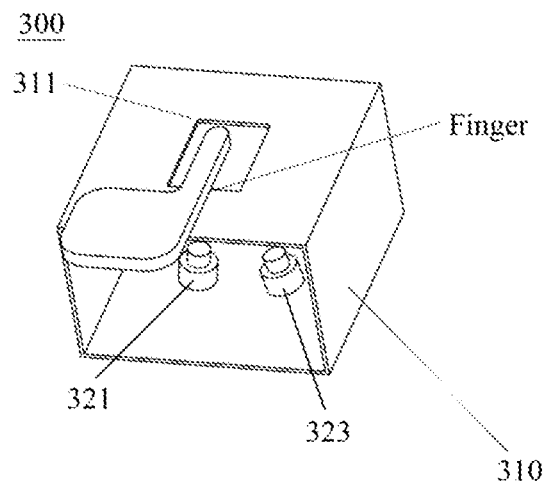
FIGS. 7A-7C schematically show different user interaction manners of contactless fingerprint acquisition devices according to different embodiments of the present disclosure.
Figure 7B:
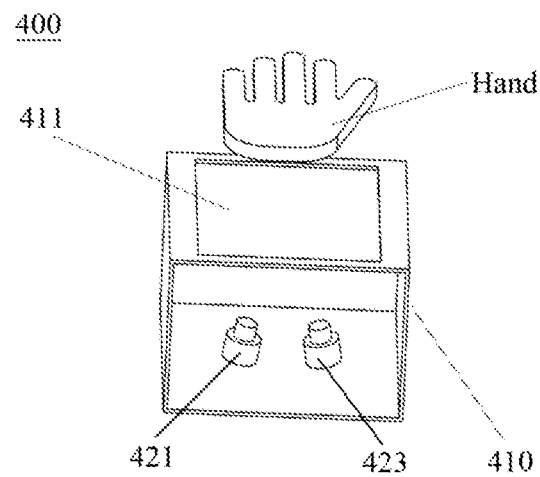
Figure 7C:
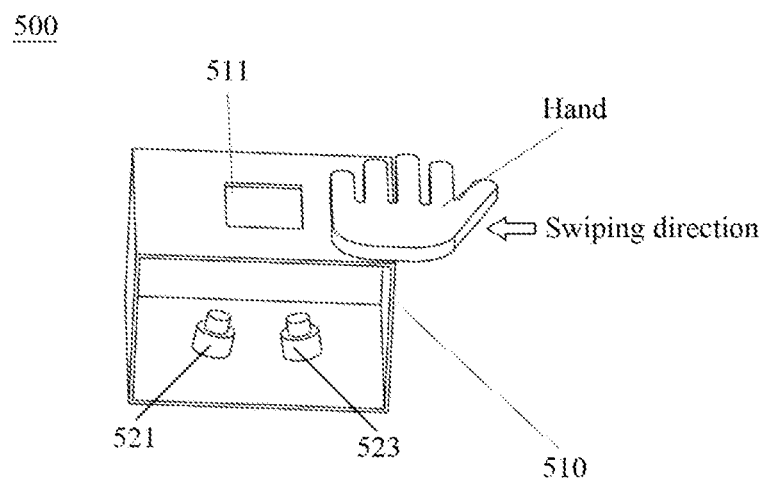

FIGS. 7A-7C schematically show different user interaction manners of contactless fingerprint acquisition devices according to different embodiments of the present disclosure.

As shown in FIG. 7A, the contactless fingerprint acquisition device 300 comprises two image capturing devices 321 and 323 located in the housing 310. The at least one finger to be scanned is a single finger, and the single finger is placed in the finger scanning area 311 and is in a static state during acquisition of the plurality of partial fingerprint images. As shown in FIG. 7B, the contactless fingerprint acquisition device 400 comprises two image capturing devices 421 and 423 located in the housing 410. The at least one finger to be scanned comprises a thumb and/or other four fingers, and the thumb and/or other four fingers are placed in the finger scanning area 411 and are in a static state during acquisition of the plurality of partial fingerprint images. As shown in FIG. 7C, the contactless fingerprint acquisition device 500 comprises two image capturing devices 521 and 523 located in the housing 510. The at least one finger to be scanned comprises a thumb and/or other four fingers, and the thumb and/or other four fingers swipe through the finger scanning area 511 during acquisition of the plurality of partial fingerprint images. In the user interaction manner as shown in FIG. 7C, the two image capturing devices 521 and 523 can be global shutter cameras.

As shown in FIGS. 7A-7C, the contactless fingerprint acquisition devices according to embodiments of the present disclosure can support multiple user interaction manners. For example, as shown in FIG. 7A, the user may place one finger at a time on the finger scanning area. This design only requires a small finger scanning area and may be compact and cost effective. Alternatively, as shown in FIG. 7C, the user may swipe his or her fingers through the finger scanning area. In this way, multiple fingerprints can be captured at once. In another embodiment, as shown in FIG. 7B, the device can be designed with a larger finger scanning area, allowing multiple fingers to be placed and captured simultaneously. This can shorten the total acquisition time while obtaining high quality fingerprint images.

It should be understood that, the number of the image capturing devices in the contactless fingerprint acquisition device is not limited to two, three or more image capturing devices can be used instead, though only two image capturing devices are shown in FIGS. 7A-7C as an example.

In another embodiment, the at least two image capturing devices are three cameras comprising a first camera, a second camera and a third camera, and the second camera is arranged between the first camera and the third camera. The second camera has an optical axis in an angle of zero with the vertical direction, and each of the first and the third cameras has an optical axis in an angle within the range of 0 to 45 degrees with the vertical direction. Therefore, three cameras can be used, with one focusing on the left region of the finger, one focusing on the middle region of the finger and one focusing on the right region of the finger, to further increase the total fingerprint area that can be collected by the contactless fingerprint acquisition device. Other camera arrangement, for example, one camera focusing on the fingertip region, one camera focusing on the left region of the finger and one camera focusing on the right region of the finger, can also be used to increase the total area of the captured fingerprint image.

Figure 8:
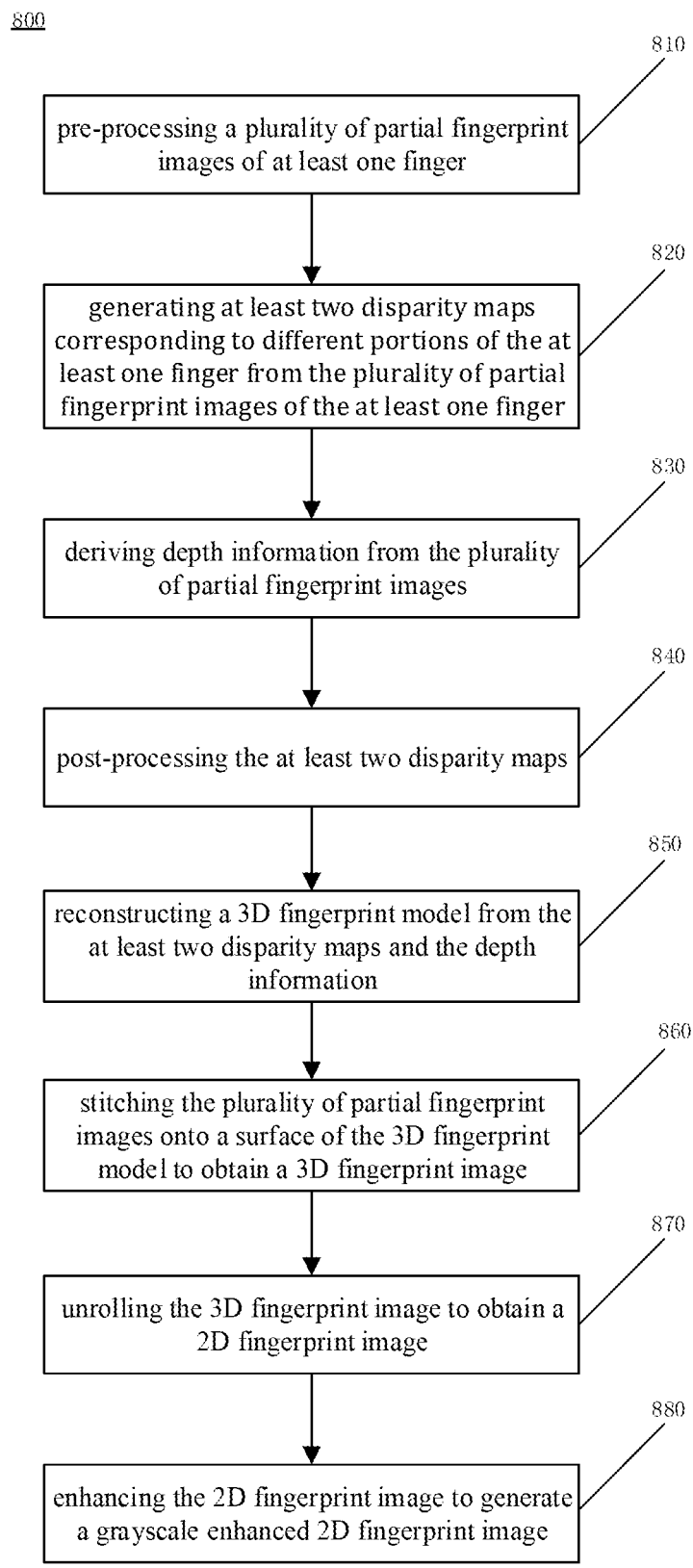
FIG. 8 schematically shows a flow chart of a method for contactless fingerprint acquisition according to an embodiment of the present disclosure.

FIG. 8 schematically shows a flow chart of a method 800 for contactless fingerprint acquisition according to an embodiment of the present disclosure.

As shown in FIG. 8, at block 810, the method 800 pre-processes a plurality of partial fingerprint images of at least one finger. In an example, the pre-processing comprises local contrast normalization of the plurality of partial fingerprint images and enhancement of ridges of the plurality of partial fingerprint images.

At block 820, the method 800 generates at least two disparity maps corresponding to different portions of the at least one finger from the plurality of partial fingerprint images of the at least one finger. The plurality of partial fingerprint images of the at least one finger can be acquired by at least two image capturing devices, for example. In an example, the at least two disparity maps are generated by applying a trained deep neural network on the plurality of partial fingerprint images.

At block 830, the method 800 derives depth information from the plurality of partial fingerprint images. In an example, deriving depth information from the plurality of partial fingerprint images comprises deriving the depth information by use of at least one of active stereo vision, structured light, time-of-flight (ToF) and photometrics stereo. Therefore, depth sensing technique like active stereo vision, structured light, time-of-flight (ToF) and/or photometrics stereo can be further used to derive depth information from the plurality of partial fingerprint images.

At block 840, the method 800 post-processes the at least two disparity maps. In an example, the post-processing comprises smoothing the at least two disparity maps by interpolation to correct disparity values in an erroneous region of the at least two disparity maps and extrapolating disparity values in a boundary region of the at least two disparity maps.

At block 850, the method 800 reconstructs a 3D fingerprint model from the at least two disparity maps and the depth information. In an example, reconstructing the 3D fingerprint model comprises reconstructing the 3D fingerprint model from the at least two disparity maps and the depth information derived by use of at least one of active stereo vision, structured light, time-of-flight (ToF) and photometrics stereo.

At block 860, the method 800 stitches the plurality of partial fingerprint images onto a surface of the 3D fingerprint model to obtain a 3D fingerprint image.

At block 870, the method 800 unrolls the 3D fingerprint image to obtain a 2D fingerprint image. In an example, unrolling the 3D fingerprint image comprises: producing a parameterized surface by a mesh generator to obtain a first grid from a surface of the 3D fingerprint model; finding an embedding of the parameterized surface into a Euclidean 2D plane by iteration to obtain a second grid; and mapping the surface of the 3D fingerprint model onto the Euclidean 2D plane by interpolation on the second grid.

At block 880, the method 800 enhances the 2D fingerprint image to generate a grayscale enhanced 2D fingerprint image. In an example, enhancement of the 2D fingerprint image is performed by applying a trained deep neural network.

It should be understood that, although eight blocks 810-880 are shown in the flow chart of the method 800, the blocks 810, 840, 870 and 880 are optional ones and can be used according to specific applications and/or requirements. For example, the unrolling and enhancement as shown in blocks 870 and 880 can be omitted and only the 3D fingerprint image can be generated. In addition, depending on specific applications and/or requirements, the order of the above blocks in the method 800 can be changed, i.e. it is not necessary to perform the method 800 in the order described above.

Hereinafter, a method for acquiring contactless fingerprint according to an example is described in detail. FIGS. 9A-9E schematically show examples of some intermediate fingerprint images obtained by performing the method. It should be noted that, such method for contactless fingerprint acquisition is only an example for illustration, not a limitation to the present disclosure.

The image capturing devices can be two cameras, for example. First, by use of the calibration results from stereoCalibrate in OpenCV, two partial fingerprint images (a partial fingerprint image in a frame of one camera and a partial fingerprint image in a frame of the other camera) are rectified with stereoRectify function in OpenCV such that the same 3D point (pixel) in a 3D space is on the same horizontal line in the two partial fingerprint images acquired by the two cameras. Other tools, like MATLAB, can also be used instead of OpenCV.

It should be noted that, the number of the partial fingerprint images is not limited to two. According to specific applications and/or requirements, a plurality of frames of partial fingerprint images acquired by each image capturing device or partial fingerprint images acquired by three or more image capturing devices can be used.

Assume a 3D point has coordinate (x, y, z) in the 3D space. And further assume its coordinate in the partial fingerprint image acquired by the left camera is $(x_l, y_l)$, and its coordinate in the partial fingerprint image acquired by the right camera is $(x_r, y_r)$. After calibration, it is guaranteed that $y_l=y_r$, and the disparity of the point $(x_l, y_l)$ of the left partial fingerprint image is defined to be:

disparity $L=x_l-x_r$

The disparity values of each 2D point (pixel) of the left partial fingerprint image forms a 2D left disparity map.

Correspondingly, the disparity values of each 2D point (pixel) of the right partial fingerprint image forms a 2D right disparity map, which can be computed with:

disparity $R=x_r-x_l$

Therefore, two disparity maps corresponding to different portions of at least one finger can be generated from two partial fingerprint images of the at least one finger.

If the disparity value of a 2D point in a partial fingerprint image is known, then the depth of the 3D point corresponding to the 2D point can be calculated as:

$$\frac{fB}{\text{disparity}}$$

where f is the camera's focal length, and B is the baseline distance between the optical centers of the two cameras. These parameters can also be derived from the stereo calibration results.

Therefore, depth information can be derived from the two partial fingerprint images, by use of the generated disparity maps, for example.

In another embodiment, deriving depth information from the two partial fingerprint images comprises deriving the depth information by use of at least one of active stereo vision, structured light, time-of-flight (ToF) and photometrics stereo.

To make the generated disparity maps more stable, the two partial fingerprint images can be pre-processed, prior to generating the disparity maps from the two partial fingerprint images. The pre-processing can comprise local contrast normalization of the two partial fingerprint images and enhancement of ridges of the two partial fingerprint images.

Figure 9A:
FIGS. 9A-9E schematically show examples of intermediate fingerprint images obtained by performing a method for contactless fingerprint acquisition according to another embodiment of the present disclosure.

For example, by use of Discrete Fourier Transform (DFT) and Discrete Cosine Transform (DCT), the ridge patterns of the two partial fingerprint images can be enhanced. DFT/DCT can be applied to obtain a frequency representation of a fingerprint image. Because the fingerprint ridges are largely parallel lines with fixed distance in between, the frequencies corresponding to the fingerprint ridges can be strengthened, and frequencies corresponding to other regions in the fingerprint image can be weakened to reduce noise. Local contrast normalization computes the mean and standard deviation of local patches for the fingerprint image on a per pixel basis and normalizes each pixel by subtracting the mean and dividing by the standard deviation. This can help remove the variance on each fingerprint region brought by illumination, dry/wet hands, etc. The normalized and enhanced partial fingerprint images are schematically shown in FIG. 9A.

The two disparity maps can be generated by applying a trained deep neural network on the two partial fingerprint images, for example. The trained deep neural network can take the two partial fingerprint images as the input, and outputs the disparity maps for both images.

For example, the deep neural network can be trained to minimize the mean squared error of the disparity values on training data. First, ground truth disparity map D between the input images $I_l$, $I_r$ may be obtained, by use of active stereo vision, structured light, time-of-flight (ToF), photometric stereo, for example, or even from synthetic data. The input images $I_l$, $I_r$ can be normalized images. The disparity model F of the deep neural network may contain 2D/3D convolution, pooling and fully connected layers. It can be optimized using iterative methods like stochastic gradient descent or its variants to minimize the mean squared error of its output with respect to the ground truth disparity values:

$$\min_F \text{ average } \left( \|F(I_l, I_r) - D\|_2^2 \right)$$

Figure 9B:

The results from the disparity model F of the deep neural network are schematically shown in FIG. 9B, where two disparity maps are generated. The two disparity maps may contain some erroneous regions. This can be corrected by post-processing the two disparity maps, prior to reconstructing a 3D fingerprint model. The post-processing can comprise smoothing the two disparity maps by interpolation to correct disparity values in an erroneous region of the two disparity maps and extrapolating disparity values in a boundary region of the two disparity maps.

Figure 9C:

For example, thin-plate-splines (TPS) is a spline-based technique for data interpolation and smoothing. It can be used to smooth the disparity maps output by the deep neural network, and correct erroneous regions that may contain drastically different disparity values than its neighboring regions in the disparity map. In addition, the boundary regions on the left/right part of the fingerprint may be partially occluded and may not be seen by the camera from the other part, and disparity values and therefore the depths of the points in these boundary regions may not be computed by the disparity model directly. Thin-plate-splines can also be used to extrapolate disparity values in these boundary regions from the nearby regions where the disparity values can be calculated by the disparity model. The post-processed disparity maps are schematically shown in FIG. 9C. Compared with unprocessed disparity maps, these post-processed disparity maps are smoothed, with less sharply transitional regions.

After generating the two disparity maps corresponding to different portions of the at least one finger from the two partial fingerprint images and deriving depth information from the two partial fingerprint images, a 3D fingerprint model can be reconstructed from the two disparity maps and the depth information, and the two partial fingerprint images can be stitched onto a surface of the 3D fingerprint model to obtain a 3D fingerprint image.

Figure 9D:

For example, with the stereo calibration results, each 2D point at the image location (x, y) and with disparity d can also be projected to a 3D point (x', y', z') using OpenCV reprojectImageTo3D function. After the projection, the two partial fingerprint images form two partial fingerprint surfaces in a 3D space. And the two partial fingerprint surfaces are aligned such that the common central region of the two partial fingerprint surfaces overlap with each other. This allows the two partial fingerprint surfaces to be combined together and therefore form a larger 3D fingerprint surface of a 3D fingerprint model, i.e. reconstruct a 3D fingerprint model with a 3D fingerprint surface. And the two partial fingerprint images are stitched onto the 3D fingerprint surface of the 3D fingerprint model to obtain a 3D fingerprint image. The stitched 3D fingerprint image is schematically shown in FIG. 9D.

In another embodiment, reconstructing the 3D fingerprint model can comprise reconstructing the 3D fingerprint model from the two disparity maps and the depth information derived by use of at least one of active stereo vision, structured light, time-of-flight (ToF) and photometrics stereo.

After the 3D fingerprint image is obtained, it can be directly used in 3D fingerprint matching. Alternatively, it can also be further unrolled and enhanced to obtain a 2D image compatible with a traditional rolled fingerprint scanner.

The unrolling of the 3D fingerprint image can obtain a 2D fingerprint image. The unrolling of the 3D fingerprint image can comprise the following steps, for example.

First, a parameterized surface is produced by a mesh generator to obtain a first grid from a surface of the 3D fingerprint model. In particular, given a surface of the 3D fingerprint model, Delaunay triangulation or other rectangular mesh generator can be used to produce a parameterized surface. The result is a coarse or fine grid, depending on the resolution of the parameterization.

Second, an embedding of the parameterized surface into a Euclidean 2D plane is found by iteration to obtain a second grid. In particular, given the parameterized surface, an embedding of the surface into a Euclidean 2D plane is found iteratively. For example, the following steps can be involved in this procedure.

(1) Given an input grid, such as the first grid above, output a grid that is an approximate isometric embedding of the surface into the Euclidean 2D plane. The output does not need to have fine regularity.

(2) Given the result grid of step (1), smooth the grid to increase regularity.

(3) Similar to the step (1), except that the input grid can be the result grid of step (2) and there is regularity constraint on the output grid.

(4) Given a coarse grid with certain regularity, such as the result grid of step (3), output a fine grid that doubles in resolution and preserves the regularity.

The end result of this iterative procedure is a fine grid that is an approximate isometric embedding of the surface and preserves regularity as well.

Third, the surface of the 3D fingerprint model is mapped onto the Euclidean 2D plane by interpolation on the second grid. In particular, the surface of the 3D fingerprint model is mapped onto the Euclidean 2D plane by interpolating the values on the grid, Wavelet frames can be used as the basis instead of linear interpolation to preserve more regularity as well.

After unrolling the 3D fingerprint image to obtain a 2D fingerprint image, the 2D fingerprint image can be enhanced to generate a grayscale enhanced 2D fingerprint image, which is similar to the result of a traditional rolled fingerprint scanner. To enhance ridge patterns of the fingerprint image while retaining details such as locations and orientations, enhancement of the 2D fingerprint image can be performed by applying a trained deep neural network. For example, a combination of computational method(s) and deep neural network can be used.

For example, firstly, Discrete Fourier Transform/Discrete Cosine Transform and/or other computational methods can be applied on the 2D fingerprint image to enhance the fingerprint ridges, with local contrast normalization to standardize the image, similar to the above pre-processing step.

Pairs of such enhanced 2D fingerprint images and their corresponding fingerprint images captured from the contact-based rolled fingerprint scanner can be obtained by asking individuals to capture fingerprints on both devices. The pairs can be further aligned by running standard fingerprint matching algorithms (for example, the Bozorth matcher) and aligned with fingerprint minutiae (i.e. the ending and bifurcations of the fingerprint ridge lines).

When these pairs of data are generated, a deep neural network can be trained to obtain a rolled fingerprint image from the enhanced 2D fingerprint image as the input. Assuming that the aligned 2D fingerprint image is X and the rolled fingerprint image is Y, then the deep neural network G is trained to minimize the average mean squared error between X and Y:

$$\min_{G} \text{average} \left( \|G(X) - Y\|_2^2 \right)$$

Figure 9E:

After the deep neural network G is trained, it can be used to perform enhancement and generate a fingerprint image compatible with the traditional rolled fingerprint scanner. An example of a final unrolled and enhanced 2D fingerprint image is shown in FIG. 9E.

In the method according to the example, because the image capturing devices like cameras have been calibrated using tools like OpenCV or MATLAB, their relative translation and rotation parameters can be calculated. The partial fingerprint images can be mapped to different regions of the surface of the reconstructed 3D fingerprint model and stitched together, resulting in a large-area 3D fingerprint image. To be compatible with the traditional 2D fingerprint database, the 3D fingerprint can also be unrolled to obtain a 2D fingerprint image, simulating the rolling process of the finger on a plane.

Figure 10:
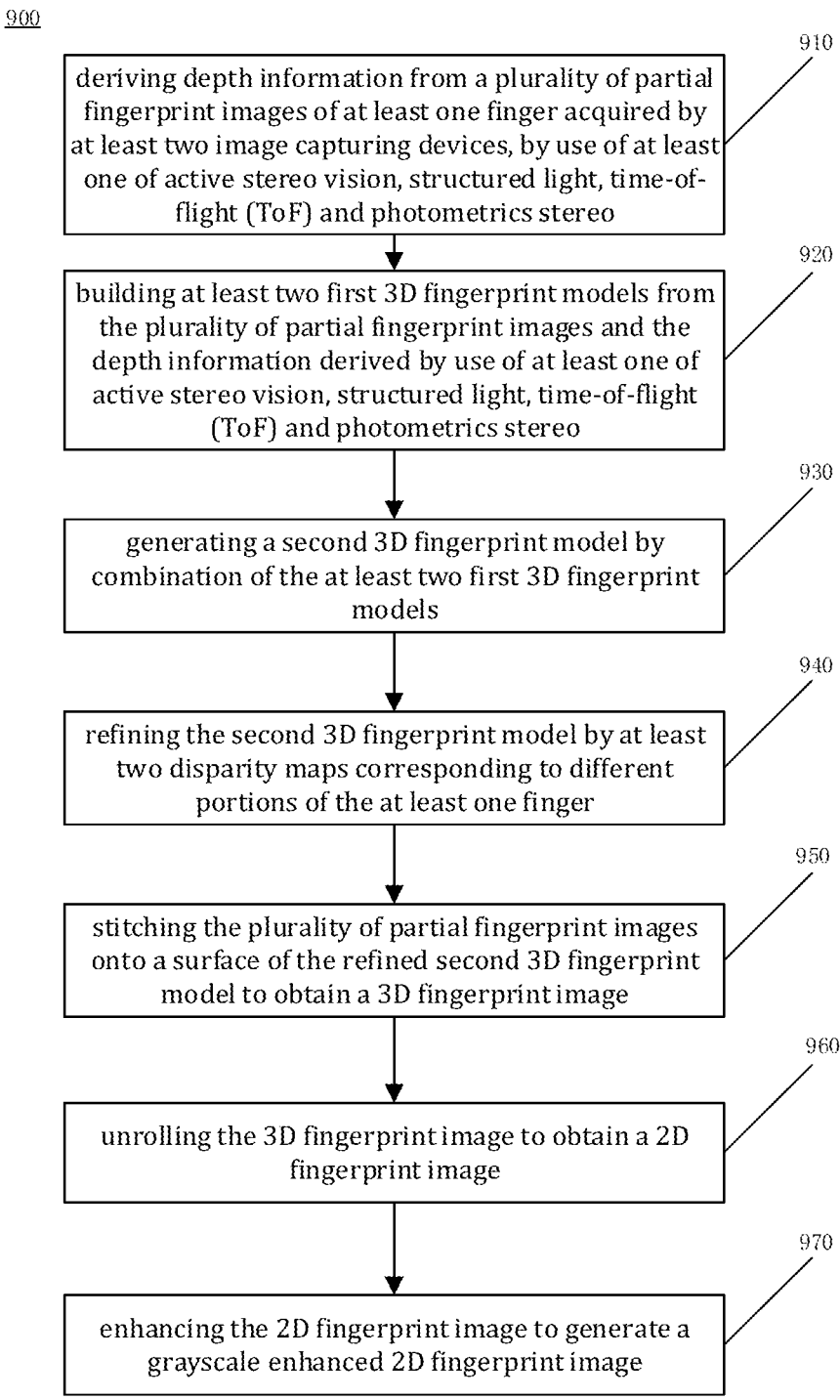
FIG. 10 schematically shows a flow chart of a method for contactless fingerprint acquisition according to another embodiment of the present disclosure.

FIG. 10 schematically shows a flow chart of a method 900 for contactless fingerprint acquisition according to another embodiment of the present disclosure.

As shown in FIG. 10, at block 910, the method 900 derives depth information from a plurality of partial fingerprint images of at least one finger acquired by at least two image capturing devices, by use of at least one of active stereo vision, structured light, time-of-flight (ToF) and photometrics stereo. Therefore, depth sensing technique like active stereo vision, structured light, time-of-flight (ToF) and/or photometrics stereo can be used to derive the depth information.

At block 920, the method 900 builds at least two first 3D fingerprint models from the plurality of partial fingerprint images and the depth information derived by use of at least one of active stereo vision, structured light, time-of-flight (ToF) and photometrics stereo.

At block 930, the method 900 generates a second 3D fingerprint model by combination of the at least two first 3D fingerprint models.

At block 940, the method 900 refines the second 3D fingerprint model by at least two disparity maps corresponding to different portions of the at least one finger. According to an example, the at least two disparity maps can be generated by applying a trained deep neural network on the plurality of partial fingerprint images of the at least one finger, as described above.

At block 950, the method 900 stitches the plurality of partial fingerprint images onto a surface of the refined second 3D fingerprint model to obtain a 3D fingerprint image. In case that the refinement in block 940 is not adopted, the plurality of partial fingerprint images are stitched onto a surface of the second 3D fingerprint model generated in block 930 to obtain a 3D fingerprint image.

At block 960, the method 900 unrolls the 3D fingerprint image to obtain a 2D fingerprint image.

At block 970, the method 900 enhances the 2D fingerprint image to generate a grayscale enhanced 2D fingerprint image.

It should be understood that, although seven blocks 910-970 are shown in the flow chart of the method 900, the blocks 940, 960 and 970 are optional ones and can be used according to specific applications and/or requirements. For example, the refinement of the second 3D fingerprint model as shown in block 940 can be omitted. And the unrolling and enhancement as shown in blocks 960 and 970 can be omitted, and only the 3D fingerprint image can be generated. In addition, depending on specific applications and/or requirements, the order of the above blocks in the method 900 can be changed, i.e. it is not necessary to perform the method 900 in the order described above.

In the method 900, depth sensing technique, like active stereo vision, structured light, time-of-flight (ToF) and/or photometrics stereo, can be used standalone, or in combination with disparity maps, to form a 3D fingerprint model. The disparity maps can be generated by applying a trained deep neural network.

The adoption of the depth sensing technique may require additional hardware, but the method for contactless fingerprint acquisition may need less computation and be more stable. As described above, the depth sensing technique, like active stereo vision, structured light, time-of-flight (ToF) and/or photometrics stereo, can also be used in combination with the disparity maps to achieve even higher accuracy.

In the above methods for contactless fingerprint acquisition according to embodiments of the present disclosure, some steps like reconstruction of a 3D fingerprint model, unrolling of a 3D fingerprint image and enhancement of a 2D fingerprint image may be computing intensive. These computing intensive steps may be performed locally. Alternatively, partial fingerprint images may be transmitted to remote server(s), which can perform the computing intensive steps and accelerate processing.

Figure 11:
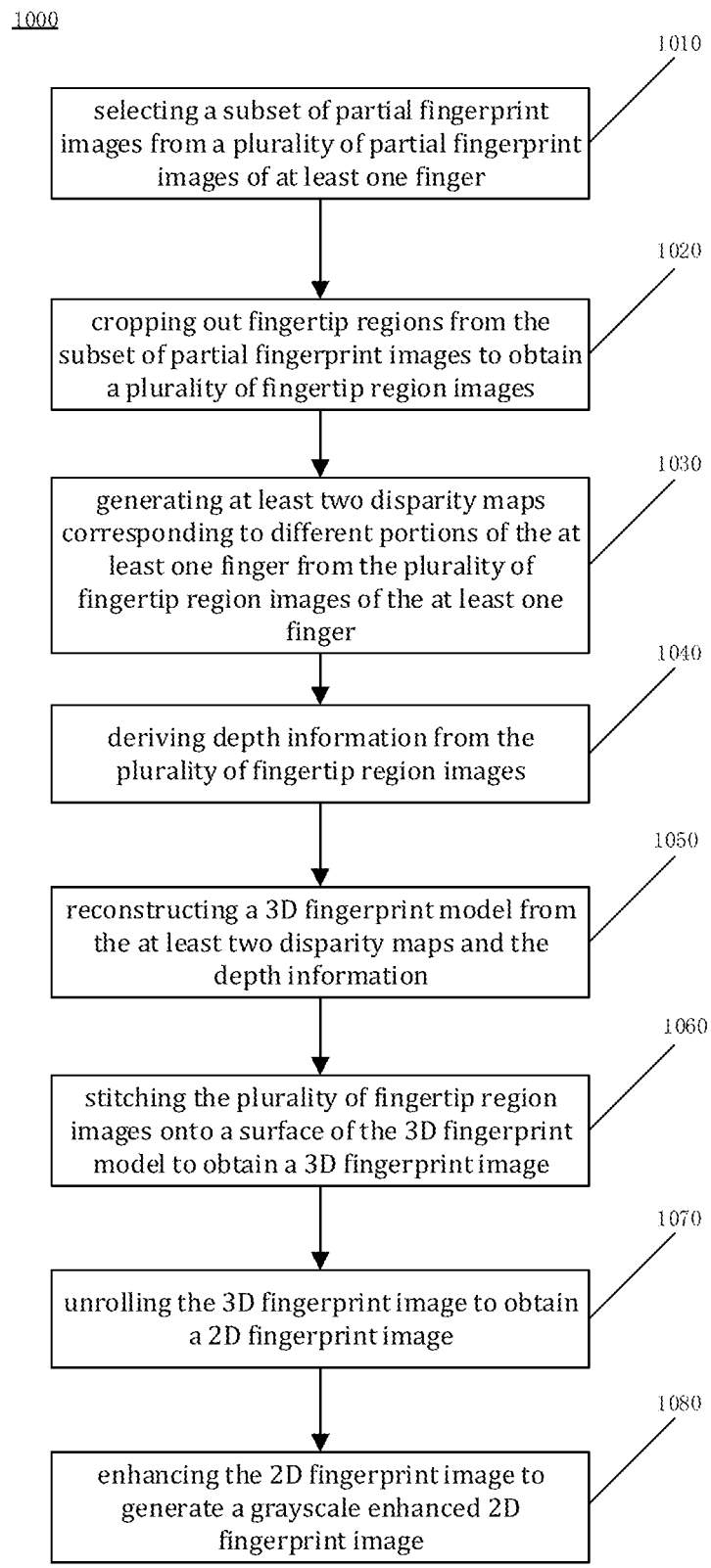
FIG. 11 schematically shows a flow chart of a method for contactless fingerprint acquisition according to another embodiment of the present disclosure.

FIG. 11 schematically shows a flow chart of a method for contactless fingerprint acquisition according to another embodiment of the present disclosure.

As shown in FIG. 11, at block 1010, the method 1000 selects a subset of partial fingerprint images from a plurality of partial fingerprint images of at least one finger. For example, among a plurality of frames of partial fingerprint images acquired by each image capturing device, one frame of partial fingerprint image with high image quality can be selected. And therefore, a subset of partial fingerprint images can be selected from the plurality of partial fingerprint images acquired by image capturing devices.

At block 1020, the method 1000 crops out fingertip regions from the subset of partial fingerprint images to obtain a plurality of fingertip region images.

Through the blocks 1010 and 1020, fingertip region images with high image quality can be selected. If these fingertip region images with high image quality, instead of all partial fingerprint images of the finger, are to be transmitted across a network and received by a server, as described below, the bandwidth to be occupied and the latency of the network can be reduced.

After the plurality of fingertip region images are obtained by cropping out fingertip regions, as shown in block 1020, the plurality of fingertip region images can be received by a server and are further processed by the server. For example, the following steps as shown in blocks 1030-1080 can be performed by the server. There may be multiple remote servers, for example, each with computing processor(s), such as multi-core CPU(s) and GPU(s). Therefore, the plurality of fingertip region images can be processed in parallel at fast speed.

At block 1030, the method 1000 generates at least two disparity maps corresponding to different portions of the at least one finger from the plurality of fingertip region images.

At block 1040, the method 1000 derives depth information from the plurality of fingertip region images.

At block 1050, the method 1000 reconstructs a 3D fingerprint model from the at least two disparity maps and the depth information.

At block 1060, the method 1000 stitches the plurality of fingertip region images onto a surface of the 3D fingerprint model to obtain a 3D fingerprint image.

At block 1070, the method 1000 unrolls the 3D fingerprint image to obtain a 2D fingerprint image.

At block 1080, the method 1000 enhances the 2D fingerprint image to generate a grayscale enhanced 2D fingerprint image.

The steps as shown in blocks 1030-1080 can be performed in a similar way to those described above, except that the fingerprint images to be processed are selected fingertip region images. Therefore, the details for performing these steps will not be repeated herein.

After the 3D fingerprint image and the enhanced 2D fingerprint image are obtained by processing on the server, the 3D fingerprint image and the enhanced 2D fingerprint image can be transmitted or sent back from the server.

It should be understood that, although eight blocks 1010-1080 are shown in the flow chart of the method 1000, the blocks 1010, 1020, 1070 and 1080 are optional ones and can be used according to specific applications and/or requirements. For example, the plurality of fingertip region images can be generated in other ways rather than that as shown in blocks 1010 and 1020. The unrolling and enhancement as shown in blocks 1070 and 1080 can be omitted and only the 3D fingerprint image can be generated and transmitted from the server. Rather than performing the steps as shown in blocks 1030-1080 on the server, these steps can be performed locally as well. In addition, depending on specific applications and/or requirements, the order of the above blocks in the method 1000 can be changed, i.e. it is not necessary to perform the method 1000 in the order described above.

After the 3D and unrolled 2D fingerprints are acquired, they can then be used in various applications. For criminal investigation, they can be automatically sent to Automated Fingerprint Identification System (AFIS) to match against previously collected 3D/2D fingerprints to determine whether the person's fingerprints have been collected before, or matched against latent fingerprints collected from unsolved crime scenes to help solve these cases. Alerts can be triggered automatically if a match is found against a suspect. They can also be sent to AFIS for broader applications, such as access control, authorization, and payment, and can also be used in government, banking, hospitals, hotels, education and other industries.

According to another embodiment of the present disclosure, a computer readable storage medium is provided. The computer readable storage medium comprises instructions which, when executed by a processor, cause the processor to perform the methods as described herein.

As will be appreciated by those skilled in the art, aspects of the present disclosure may be embodied as a device, system, method or computer program product. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more computer readable storage medium(s) having computer readable program code embodied thereon.

For example, a contactless fingerprint acquisition device according to an embodiment of the present disclosure can comprise a processor and a memory. The memory comprises instructions which, when executed by the processor, cause the processor to perform the methods as described herein, so that a plurality of partial fingerprint images can be processed to obtain a 3D fingerprint image by combination of the plurality of partial fingerprint images.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While the disclosure has been illustrated and described in detail in the drawings and foregoing description, such illustration and description are to be considered illustrative or exemplary and not restrictive. The disclosure is not limited to the disclosed embodiments. The different embodiments described above can also be combined. Other variations to the disclosed embodiments can be understood and effected by those skilled in the art in practicing the claimed disclosure, from the study of the drawings, the disclosure and the appended claims.

In the claims, the word "comprising" does not exclude other elements or steps, and the indefinite article "a" or "an" does not exclude a plurality. The mere fact that measures are recited in mutually different dependent claims does not indicate that a combination of these measures cannot be used to advantage. The reference signs in the claims should not be construed as limiting the scope of these claims.

What is claimed is:

1. A contactless fingerprint acquisition device, comprising:
   a housing including a finger scanning area for at least one finger;
   at least two image capturing devices located in the housing and arranged in a predetermined baseline distance, each image capturing device having an optical axis in a predetermined angle with a vertical direction; and
   a lighting unit in the housing for illuminating the at least one finger,
   wherein the at least two image capturing devices are operable to acquire a plurality of partial fingerprint images of the at least one finger, and the plurality of partial fingerprint images correspond to different portions of the at least one finger, and wherein the contactless fingerprint acquisition device further comprises:
   a structured light component; and
   a processor configured for:
      deriving, by means of the structured light component, depth information from the plurality of partial fingerprint images of the at least one finger;
      building at least two first 3D fingerprint models from the plurality of partial fingerprint images and the depth information:
      generating a second 3D fingerprint model by combination of the at least two first 3D fingerprint models;
      stitching the plurality of partial fingerprint images onto a surface of the second 3D fingerprint model to obtain a 3D fingerprint image;
      unrolling the 3D fingerprint image to obtain a 2D fingerprint image; and
      enhancing the 2D fingerprint image to generate a grayscale enhanced 2D fingerprint image.

2. The contactless fingerprint acquisition device of claim 1, wherein the lighting unit comprises at least one visible light source and at least one optical component arranged above the at least one visible light source.

3. The contactless fingerprint acquisition device of claim 2, wherein the lighting unit comprises three visible light sources positioned at different angles with a horizontal direction and three optical components arranged above the three visible light sources, respectively, and
   wherein the three visible light sources illuminate the left side, the right side and the upper side of the at least one finger, respectively, and illuminated regions of the three visible light sources overlap.

4. The contactless fingerprint acquisition device of claim 1, wherein the lighting unit comprises a ring-type visible light source.

5. The contactless fingerprint acquisition device of claim 1, wherein the at least two image capturing devices are cameras, and wherein the aperture of camera lens of each camera has a F-number in the range 4 to 12, where the F number is the ratio of a focal length of the camera lens of each camera to a diameter of an entrance pupil of the camera lens.

6. The contactless fingerprint acquisition device of claim 1, wherein the at least two image capturing devices are cameras, and light from the lighting unit flashes simultaneously with shutters of the cameras.

7. The contactless fingerprint acquisition device of claim 1, wherein the at least two image capturing devices are two cameras, and wherein the predetermined baseline distance between the two cameras is in the range of 3 cm to 20 cm, and the predetermined angle is in the range of 5 to 45 degrees.

8. The contactless fingerprint acquisition device of claim 1, wherein the at least two image capturing devices are global shutter cameras.

9. The contactless fingerprint acquisition device of claim 1, wherein the at least two image capturing devices are three cameras comprising a first camera, a second camera and a third camera, and the second camera is arranged between the first camera and the third camera, and wherein the second camera has an optical axis in an angle of zero with the vertical direction, and each of the first and the third cameras has an optical axis in an angle within the range of 0 to 45 degrees with the vertical direction.

10. A method for contactless fingerprint acquisition, comprising:
   deriving, by means of a structured light component, depth information from a plurality of partial fingerprint images of at least one finger;
   building at least two first 3D fingerprint models from the plurality of partial fingerprint images and the depth information;
   generating a second 3D fingerprint model by combination of the at least two first 3D fingerprint models;
   stitching the plurality of partial fingerprint images onto a surface of the second 3D fingerprint model to obtain a 3D fingerprint image;
   unrolling the 3D fingerprint image to obtain a 2D fingerprint image; and
   enhancing the 2D fingerprint image to generate a grayscale enhanced 2D fingerprint image.

11. The method of claim 10, further comprising: prior to stitching the plurality of partial fingerprint images onto the surface of the second 3D fingerprint model, refining the second 3D fingerprint model by at least two disparity maps corresponding to different portions of the at least one finger.

12. The method of claim 11, wherein the at least two disparity maps are generated by applying a trained deep neural network on the plurality of partial fingerprint images.

13. The method of claim 10, wherein unrolling the 3D fingerprint image comprises:
   producing a parameterized surface by a mesh generator to obtain a first grid from a surface of the second 3D fingerprint model;
   finding an embedding of the parameterized surface into a Euclidean 2D plane by iteration to obtain a second grid; and
   mapping the surface of the second 3D fingerprint model onto the Euclidean 2D plane by interpolation on the second grid.

14. A non-transitory computer readable storage medium comprising instructions which, when executed by a processor, cause the processor to perform operations comprising:
   deriving, by means of a structured light component, depth information from a plurality of partial fingerprint images of at least one finger;
   building at least two first 3D fingerprint models from the plurality of partial fingerprint images and the depth information;
   generating a second 3D fingerprint model by combination of the at least two first 3D fingerprint models;
   reconstructing a 3D fingerprint model from the at least two disparity maps and the depth information; and
   stitching the plurality of partial fingerprint images onto a surface of the 3D fingerprint model to obtain a 3D fingerprint image.

* * * * *